United States Patent
Garrett et al.

[11] Patent Number: 6,047,378
[45] Date of Patent: Apr. 4, 2000

[54] WAKE MULTIPLE OVER LAN

[75] Inventors: Henry Michael Garrett, Raleigh; Francis Edward Noel, Jr.; Lorrie A. Tomek, both of Durham, all of N.C.

[73] Assignee: International Business Machines Corporation, Armonk, N.Y.

[21] Appl. No.: 08/940,106

[22] Filed: Sep. 29, 1997

[51] Int. Cl.[7] .................................................. G06F 1/00
[52] U.S. Cl. ........................... 713/300; 713/310; 713/320
[58] Field of Search .......................... 395/750.01, 750.02, 395/750.03, 750.05, 750.06, 750.08

[56] References Cited

U.S. PATENT DOCUMENTS

| | | | |
|---|---|---|---|
| 4,635,195 | 1/1987 | Jeppesen, III et al. | 364/200 |
| 4,930,159 | 5/1990 | Kravitz et al. | 380/23 |
| 5,396,636 | 3/1995 | Gallagher et al. | 395/750 |
| 5,404,544 | 4/1995 | Crayford | 395/700 |
| 5,493,568 | 2/1996 | Sampat et al. | 370/60 |
| 5,606,704 | 2/1997 | Pierce et al. | 395/750 |
| 5,809,313 | 9/1998 | Gianni | 395/750.02 |
| 5,884,028 | 3/1999 | Kindel et al. | 395/200.09 |

*Primary Examiner*—Ayaz R. Sheikh
*Assistant Examiner*—Tim Vo
*Attorney, Agent, or Firm*—Joscelyn G Cockburn

[57] ABSTRACT

Multiple stations, such as Personal Computers, are awakened (restored to full power) by a specially formatted Local Area Network (LAN) frame termed "Wake Multiple Over LAN". The frame includes a header field containing Destination Addresses, DA, of stations to be awakened and a data field containing a Group Address (GA) or Universal Wake-Up Address (UWUA). The receiving station parses the frame and if the station is a member of the group, it is returned to full power.

17 Claims, 6 Drawing Sheets

UWUA - UNIVERSAL WAKE-UP ADDRESS

DA - DESTINATION ADDRESS
SYNC - SYNCHRONIZING FIELD
GA - GROUP ADDRESS

NOTE: SEE SHEET 5 FOR FIG. 3C

WAKE MULTIPLE OVER LAN

BACKGROUND OF THE INVENTION

1. Field of the Invention

The present invention relates to computer networks in general and, in particular, to electrical power management in said networks.

2. Prior Art

The reduction of electrical power consumption in computer networks is a desirable goal which is met by using so called "Green PCs" (Personal Computers) and specially formatted LAN (Local Area Network) packets for waking up the PCs. Green PCs are built with power saving capabilities which allow them to power off or reduce power consumption (sleep) during periods of non-use.

In order to restore the PCs to full power status (wake), a specially formatted frame termed MAGIC PACKETS®, Wake-On-LAN or similar names is generated by a network management PC and transmitted on the LAN. The specially formatted frame includes the Destination Address (DA) of the PC to be awakened and the DA repeated several times in the data field of the frame. Even though all PCs on the LAN see the frame, only the one whose address is in the frame is restored to full power.

U.S. Pat. Nos. 5,396,636 and 5,404,544 are examples of the prior art using specially formatted frames to distribute "wake-up" information. In both patents, computers are switched from a low power consumption (sleep) mode to full power consumption (wake) mode based upon specially formatted frame received over the network.

Even though the prior art power management procedures and devices work well for their intended purposes, they suffer drawbacks which the below described invention addresses and corrects.

One of the drawbacks with the prior art is that the MAC address of the station has to be known. If the individual MAC address of a station is unknown, it cannot be awakened. There are times when the Network Manager may want to awaken a station, even though its MAC address is unknown. For example, the Network Manager may wish to awaken a particular NETBIOS station identified by its NETBIOS name. The current state of the art does not allow this freedom.

Another drawback is that the prior art does not allow the awakening of multiple stations with a single frame transmission. There are times when a Network Manager may wish to do so.

The inability of the prior art to awaken a station whose address is unknown or to awaken multiple stations with one frame transmission imposes unnecessary restrictions on the Network.

A straight forward solution to the above drawbacks would be for a technician to locate the station and use a manual approach such as hitting a key to "wake the station up". This approach is unacceptable because, among other reasons, it requires human intervention that is subject to errors or the station may be difficult to reach, remotely located, or behind a locked door.

SUMMARY OF THE INVENTION

Accordingly, it is an object of the present invention to provide an electrical power management system which "wake up" workstations even though the MAC addresses of the workstations are unknown.

It is another object of the present invention to wake-up multiple stations with a single frame transmission.

These objects and others are achieved by a management station that generates and transmits to the transmission network interconnecting end stations a "Wake Multiple Over LAN" frame. The frame includes a Header section containing the Destination Address (DA), and a Data Section containing a Synchronizing (Sync) pattern concatenated to a generic notation identifying a group of workstations. The generic notation could be a group address (GA), a Universal Wake-Up Address (UWUA), etc. The workstations receiving the frame and determining that they are members of the group are restored to full power. The DA, in the Header, is used by the network infrastructure (e.g., router/switch/bridge) to forward the frames to the proper destination.

The foregoing and other features and advantages of the invention will be more readily understood upon consideration of the following detailed description of the invention taken in conjunction with the accompanying drawings.

DETAILED DESCRIPTION OF THE INVENTION

Figure 1:
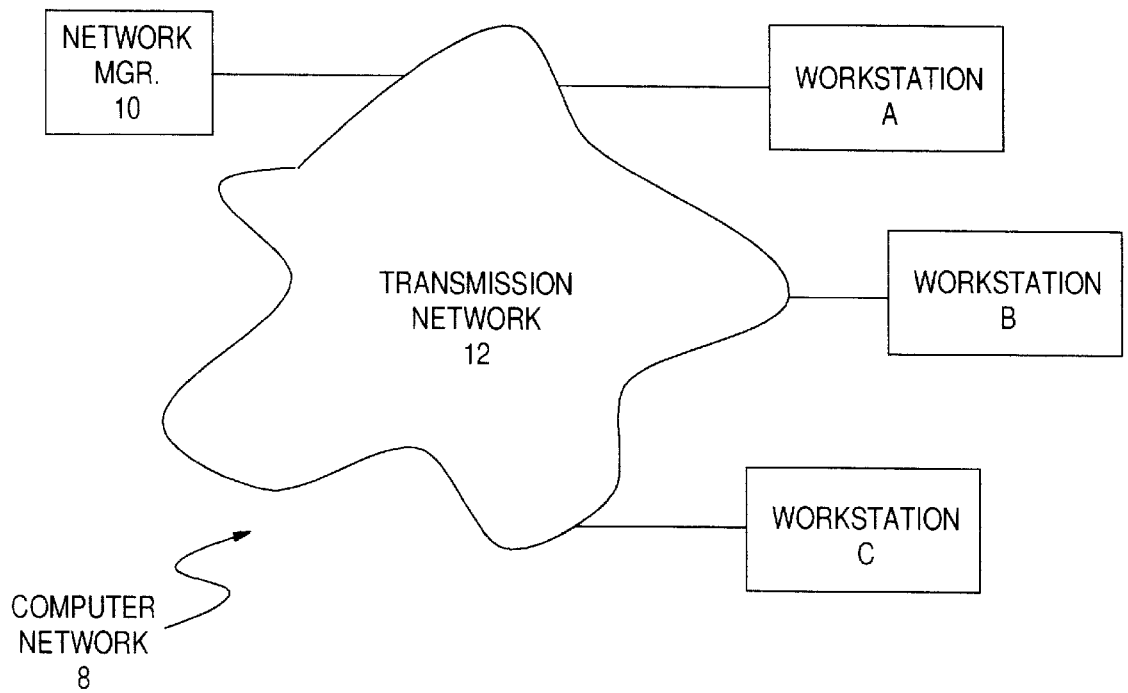
FIG. 1 illustrates a computer network according to the teachings of the present invention.

FIG. 1 shows a computer network over which the invention, to be described below, is included. The computer network includes network manager 10 interconnected by transmission network 12 to a plurality of workstations A, B, C. The showing in FIG. 1 may contain more than three workstations and more than one network manager. However, for purposes of discussion, only the minimal structure shown in FIG. 1 is necessary to understand the present invention. The transmission network 12 may include arbitrary topology such as bridged, routed, switched Local Area Network (LAN), or a mix of selected ones. In a computer network such as the one shown in FIG. 1, some of the workstations, if not used for a particular period of time, may assume a low power (sleep) mode in which a relatively small amount of power is consumed. The network manager 10 manages the network and attached workstations and may decide that it will wake-up several ones of the workstations which may be operating in the low power mode. The network manage may make the decision to perform after-hours maintenance, software upgrade, asset management, etc. on these workstations. The present invention (details below) provides the facility which allows the network manager 10 to restore full power (awake) the workstations that are operating in low power mode.

To effectuate the wake up function, the network manager 10 issues a specially formatted LAN frame (details given below) to the appropriate workstations to be awakened. The network manager 10 may use layer 3 of the OSI (Open System Interconnection) model promulgated by the International Standard Organization (ISO) to perform the routing function. The OSI model is a seven layer stack which provides in each layer requirements for managing or communicating in the network. Any workstation or network can be described in terms of OSI model. The model is so well known that further description is not warranted. As will be explained in greater detail below, the workstations receiving the Wake Multiple Over LAN frame examines or parses the frame contents. Each workstation uses its knowledge of its location in the network and the contents in the informational section of the frame to determine whether or not it should generate control signal which is used to return the station to full power mode.

Still referring to FIG. 1, for purposes of describing the present invention, it will be assumed that transmission network 12 is one of the well-known local area network (LAN) such as ethernet, IEEE 802.3, 802.5, ATM, etc. The IEEE 802.3 is the so called Carrier Sense Multiple-Access (CSMA)/Collision Detect (CD) Network that, except for minor differences, is similar to the ethernet network.

The IEEE 802.5 is the Token Ring network. Even though the invention is described in terms of one of the well known LAN interconnecting networks, it should be noted that this should not limit the scope of the invention since it is well within the skill of one skilled in the art to use the teachings of this invention and extend it to cover other types of interconnecting networks. In addition, since the frame format used in the named local area network are well known, only the fields of the frame format that are modified according to the teachings of the present invention will be described. It being understood that one skilled in the art could fill in the other subfields of the frame to make it operational in an actual network.

Figure 2A:
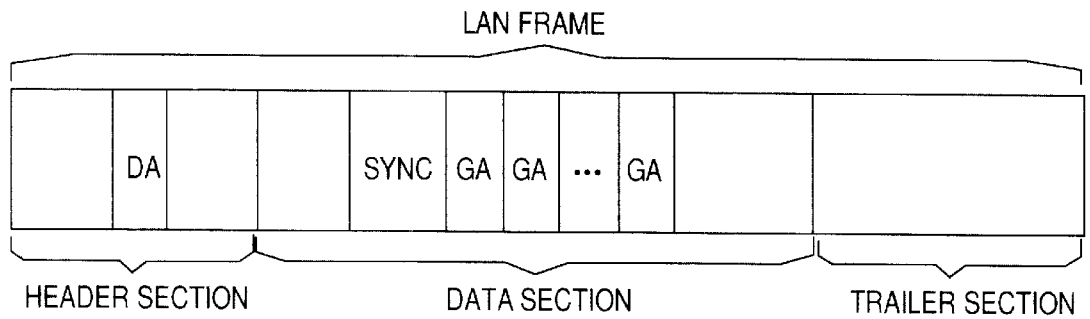
FIGS. 2A and 2B illustrate the "Wake Multiple Over LAN" frame format according to the teachings of the present invention.

FIG. 2A shows the preferred embodiment of the LAN frame used to transport wake up information between network manager 10 and the workstations connected by the LAN. The frame is a standard LAN frame including special formatted information to carry out the teachings of the present invention. The LAN frame, according to the teachings of the present invention, includes a header section, a data section and a trailer section. The Destination Address (DA) field of the header section is the portion of the field that is germane to the present invention. All other fields in the header section are similar to the standard field outlined in the respective IEEE standards and further discussion of those fields will not be given. The Destination Address (DA), according to the teachings of the present invention, could be a group address, functional address, broadcast address or other types of indicia indicting an address to multiple ones of the workstations connected to the network. The DA is used by the network infrastructure devices FIG. 1 (not shown) but may include routers, switches, bridges or the like to transport the frame to the correct workstations. The trailer section of the frame contains the standard information according to IEEE 802.3 or 802.5 and further discussion will not be given here. The data section portion of the frame is germane to the present invention and it contains a Synchronizing (Sync) pattern followed by several replications of the special identifier which identifies which workstations are to return to full power. In the preferred embodiment of the invention, the data section includes a group address (GA) repeated several times. The Sync pattern indicates the location of the special identifier in the data field.

Figure 2B:
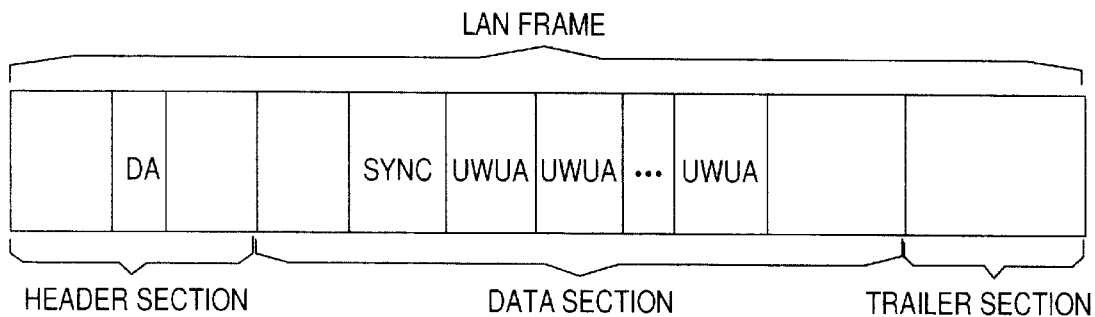

FIG. 2B shows an alternate embodiment of the "Wake Multiple Over LAN" frame format. In this embodiment, the destination address information is substantially the same as that described in FIG. 2A. However, a universal wake-up address (UWUA) is used in the data section of the frame. The UWUA is repeated several times and the Sync pattern is concatenated to the UWUA. As will be explained in more detail below, the "Wake Multiple Over LAN" frame is prepared by the network manager station and is transmitted over the LAN to the end stations. Frames that are structured with the format described in FIG. 2A are received by stations. Any station receiving the frame (and verifying the existence of the replications of the universal wake-up address) will return to full power. The chief advantage of the alternate embodiment is that it facilitates simpler (and therefore less costly) implementation.

Figure 3A:
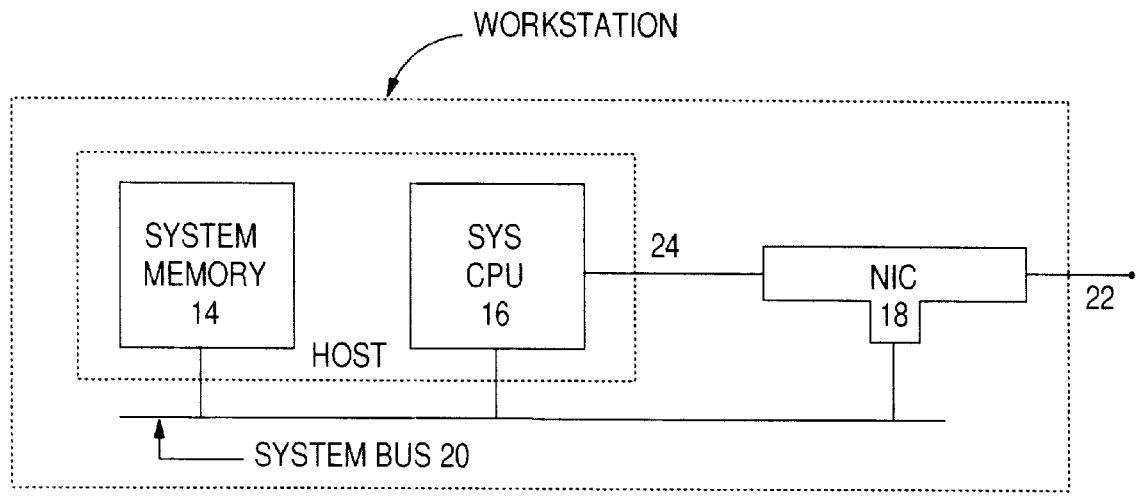
FIG. 3A illustrates a functional block diagram of a station embodying the teachings of the present invention.

FIG. 3A shows a block diagram of a workstation and/or Network Manager station incorporating the teachings of the present invention. The structure for the network manager station 10 (FIG. 1) is substantially the same as the structures for the workstations. Therefore, the showing in FIG. 3A is intended to cover the structure for the network manager 10 and/or any of the workstations connected to the network. Again, this showing is only intended to cover an example and other types of structures can be used without deviating from the spirit or scope of the present invention.

Figure 3B:
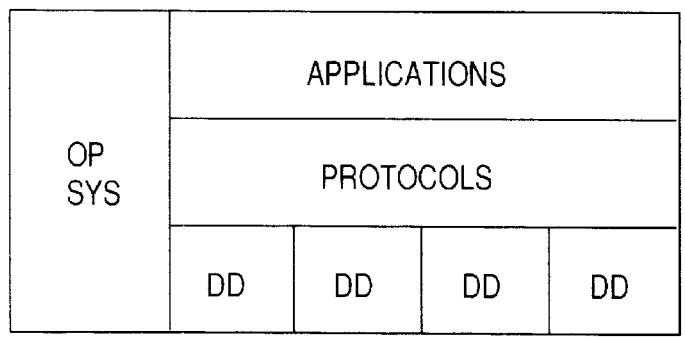
FIG. 3B shows a functional representation of software residing in the workstation.

The workstation includes a system memory 14, system CPU 16 and network interface card (NIC), hereinafter called an adapter 18. The system bus 20 interconnects the system memory, system CPU and adapter 18. The adapter 18 is connected by transmission link 22 to the transmission network 12, FIG. 1. As will be described here below, the adapter 18 makes the initial decision whether or not the workstation should be returned to full power and outputs the "power-up" signal over system bus 20 or over conductor 24 to the system. The system memory 14 and system CPU 16 are collectively referred to as the workstation. The workstation contains the software which are used to generate the "Wake Multiple Over LAN" frame, previously described, if it is a manager station. The software that resides in the workstation is shown in FIG. 3B. The software includes an operating system which can be any of the standard ones such as OS/2® or Windows, protocol software, a plurality of device drivers (DD), and applications. The special information which is generated and placed in the respective section of the "Wake Multiple Over LAN" frame is probably generated by a user application running in the workstation. The software structure shown in FIG. 3B may be stored in the system CPU 16, the system memory or both.

Figure 3C:
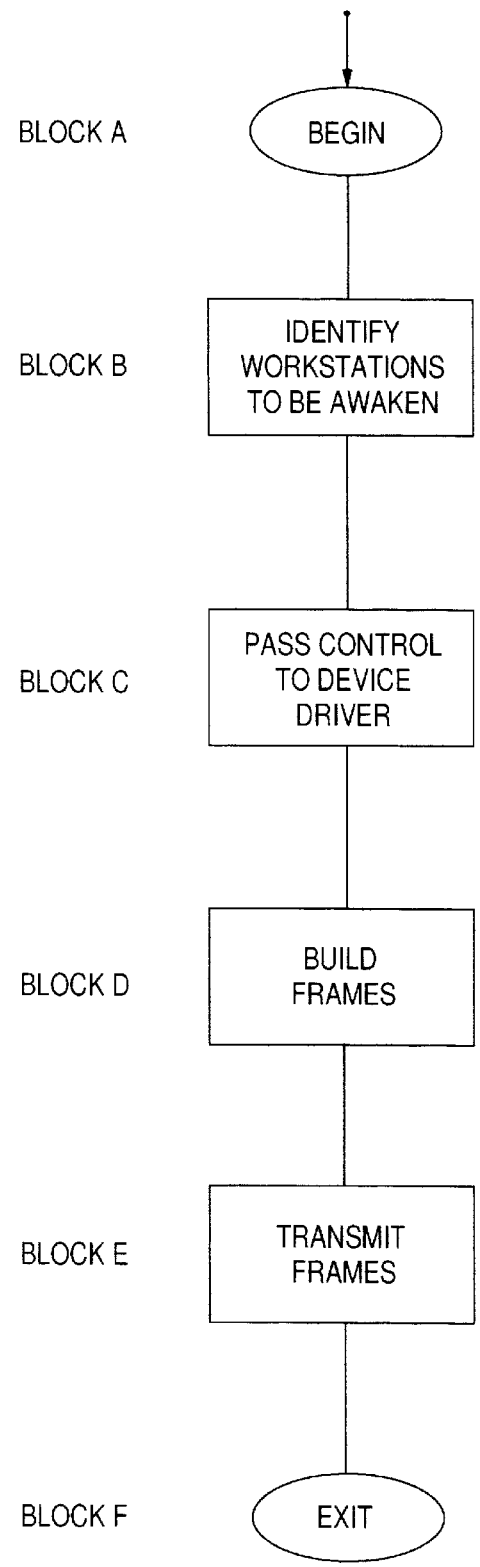
FIG. 3C shows a flowchart of a program to generate the Wake Multiple Over LAN frame.

Referring now to FIG. 3C, a flowchart of a program which could be used for generating the necessary portion of the frame according to the teachings of the present invention is shown. It should be noted that this flowchart is only an example and should not limit the scope of the invention in any way. In Block A, the program begins by initiating the sub-routine which prepares the Wake Up Frame. The process then descends into Block B, whereat the workstations to be awakened are identified and are stored with the wake-up information at selected addresses. The program then descends into Block C where control is passed to the Software Device Drivers. This is done by providing pointers which give the address for the stored wake-up information and workstations' identification numbers. The process then descends into Block D where the device drivers build the frames, including the wake-up information and workstations' identification. The process then enters steps E and F, where the frames are transmitted and the program exits the process.

Figure 4:
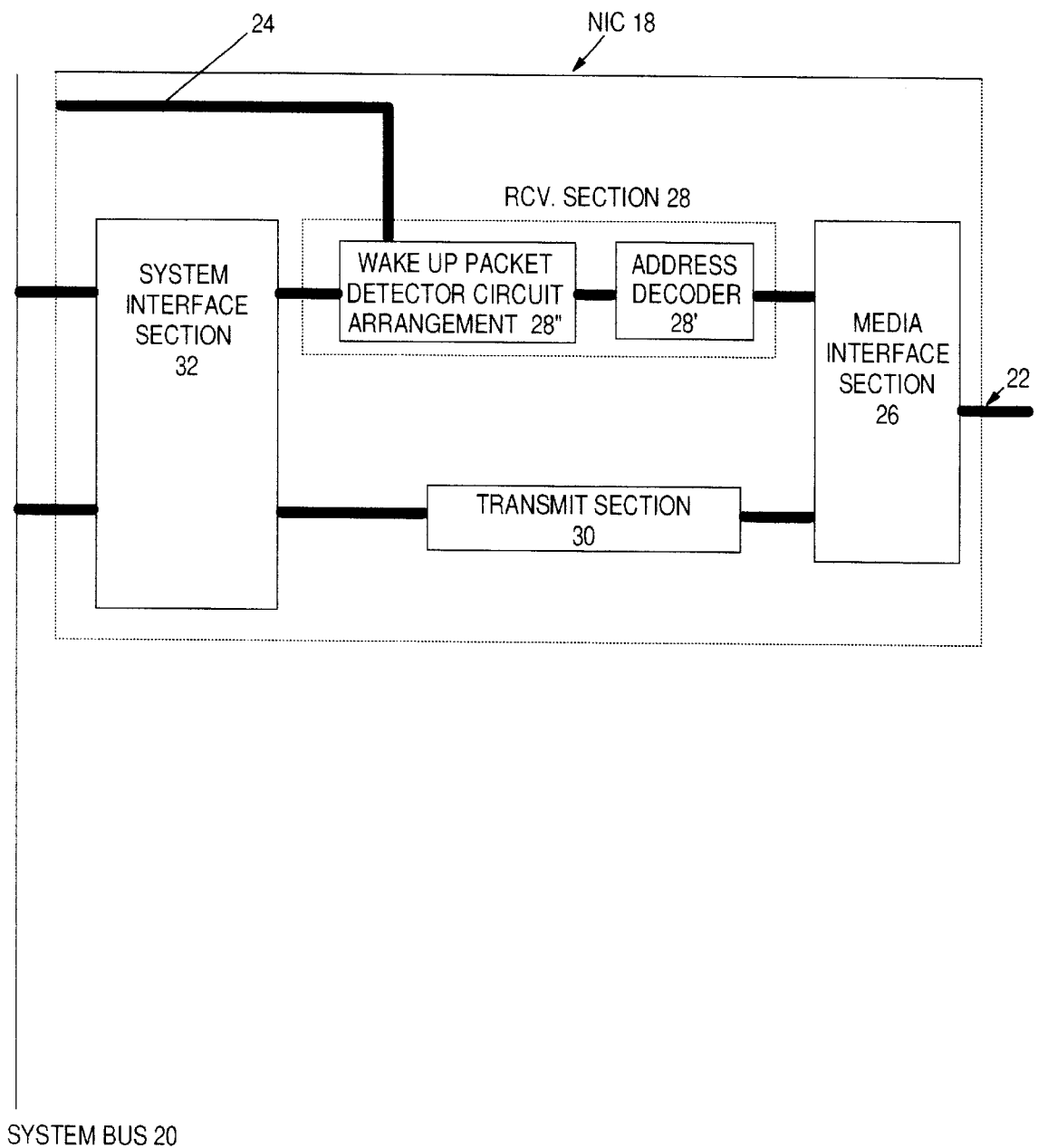
FIG. 4 shows a functional block diagram of the adapter.

FIG. 4 shows a functional block diagram for the NIC or adapter 18. For brevity, items in FIG. 4 which are similar to previously described items are identified by identical numerals and those items will not be described in this discussion since they have already been described and serve the same function as they served in the previous discussion. To this end, NIC 18 includes media interface section 26, receive (RCV) section 28, transmit section 30 and system interface section 32. The media interface section 26 connects the adapter to the network and performs the necessary functions which are required to receive and/or transmit frames from/to the network. Included in the media interface section 26 are coupling magnetics and analog and digital circuits that provide the necessary means of receiving and transmitting data on the network. The system interface section 32 couples the NIC to the system bus. To this end, it provides and includes standard circuits which enable the adapter to receive and transmit information to the workstation over system bus 20. The circuit arrangements in system interface section 32 are dependent upon the type of bus to which the adapter is connected. This bus could be a PCI bus, ISA, or any of the other type of buse. The interface circuit are designed to meet the specification of the bus to which it is connected. The bus specifications are published in the literature and it is well within the skills of one skilled in the art to use the specifications to design appropriate interface circuits. The transmit section 30 includes the transmit functions such as a transmitter which allows data to be transmitted onto the network.

Still reffering to FIG. 4, the receiver section 28 includes an address decoder 28' and wake-up packet detector circuit arrangement 28". The function of the address decoder 28' and wake-up packet detector circuit arrangement 28" is to accept or receive a packet including the "Wake Multiple Over LAN" frame, of the present invention, from the network, parse the frame and if the receive section 28 determines that the station (adapter and its attached workstation) is a member of the information received in the "Wake Multiple Over LAN" frame, generate the wake-up signal which is transmitted to the workstation over power conductor 24 or could be transmitted to the workstation over the system bus. As to whether or not the generated signal is forwarded over conductor 24 or the system bus to the workstation is a choice for the designer and will not be discussed any further in this document. Suffice it to say, once a signal is delivered to the workstation, the station is placed into full power mode (wake).

Still referring to FIG. 4, incoming data including the "Wake Multiple Over LAN" frame is received from the network over conductor 22. The media interface section 26 passes the frame to address decoder 28'. The address decoder includes the address decode function which uses logic and configuration data that is either unique to the adapter or may have been configured in the I/O adapter base on its current use make the decision to copy the incoming data or to discard the data. If the decision is made to receive the data packet, then the data is passed on to the wake-up detector 28". The parsing function in the wake-up packet detector examines the received data and determines, based on configuration data that is either unique to the adapter or has been configured based on current or recent usage, determines if the incoming data represents a valid wake-up packet intended for this workstation. It should be noted that configuring the adapter to receive a particular frame is well known in the art and details will not be given here. If the information received by the adapter is data, it is passed on over the system bus to the workstation. If the adapter has been configured to receive data packets based on the group address, then that fact is used in the determination that the adapter should wake up when the data packet containing the group addresses is received. In other words, if the DA section of the frame is a group address and it is decoded in the decoder 28', the wake up packet detector circuit arrangement 28" parses the information portion of the frame and if it contains a Sync pattern concatenated to the group address repeated several times, then the wake up packet circuit arrangement 28" would generate the appropriate wake up signal which is transmitted over 24 or the system bus. In other words, if the data packet is constructed in such a fashion that it will be received by multiple adapters, then all adapters that share the group address would be awakened. This means that the function in the wake up packet detection is either replicated for each group address that the adapter can be configured with or combined logic is implemented to have the prevailing effect.

In the alternate embodiment set forth in FIG. 2B, a special group address is created such that all adapters that implement this invention are considered to be operating with this universal address regardless of their configuration or operation and would wake up when a packet containing this universal address is received.

Referring again to FIG. 1, an example explaining the operation of the invention will be given. For purposes of the example, it is assumed that workstation A is a member of groups GA1 and GA3, that workstation B is a member of groups GA2 and GA3, and that workstation C is a member of groups GA1 and GA3. Table 1 below shows the workstation's identity in column one and the second column shows the groups to which it belongs.

TABLE 1

| Workstations | Groups |
|---|---|
| A | GA1, GA3 |
| B | GA2, GA3 |
| C | GA1, GA3 |

Assume that the network manager sends specially formatted frames with a broadcast destination address and with a group address equal to GA1 replicated in the data portion of the frame. The group addressed GA1 might be, for example, the NETBIOS functional address. Therefore, each workstation that receives the frame and verifies that it is a member of the group GA1 would return to full power. Since workstations A and C are both members of group GA1, they are returned to full power. Workstation B, however, does not return to full power. It is thus possible for the network manager to wake up selected multiple adapters without knowing the unique address assigned to each.

In the alternate embodiment described above, the network manager sends the special formatted frame to destination address GA3 with the universal wake-up address (UWUA) replicated in the data portion of the frame. Workstations A, B and C receive the frame and each verifies that each is a member of group GA3. Therefore, all three of these workstations, would be returned to full power.

It will be understood that the invention may be embodied in other specific forms without departing from the spirit or scope of the present invention. The instant examples and embodiment, therefore, are to be considered in all respects as illustrative and not restrictive to the scope or spirit of the present invention.

What is claimed is:

1. In a computer network including multiple stations, coupled by a communication system, a method for awakening multiple stations comprising the steps of:

(a) generating, in at least one of said stations, a wake-up frame including at least a first address, positioned in a first section of said wake-up frame, identifying a predetermined set of stations authorized to copy said frame and a second address, positioned in a second section of said wake-up frame, identifying stations to be returned to full power in said set of stations authorized to copy said frame; and (b) forwarding said frame onto the communications system.

2. The method of claim 1 further including the steps of:

(c) receiving the "wake-up" frame in a set of said stations;

(d) examining the "wake-up" frame; and (e) returning to full-power only stations verifying that they are members of the second address.

3. The method of claim 1 or claim 2 wherein the first address including a Destination Address (DA) and the second address including a Group Address (GA).

4. The method of claim 1 or claim 2 wherein the first address including a Destination Address (DA) and the second address including a Universal Wake-Up address.

5. The method of claim 1 wherein the "wake-up" frame further including a Synchronizing pattern concatenated to the second address.

6. The method of claim 3 wherein the "wake-up" frame further including a Sync pattern concatenated to the Group Address.

7. The method of claim 4 wherein the "wake-up" frame further includes a Sync pattern concatenated to the Universal Wake-Up Address.

8. The method of claim 7 wherein the Universal Address is repeated several times.

9. The method of claim 6 wherein the Group Address is repeated several times.

10. The method of claims 1 or 5 wherein the second address is repeated several times within said frame.

11. The method of claims 1 or 10 wherein the second address includes a NETBIOS Functional Address.

12. A method for awaking stations in a computer network including a communications system interconnecting the stations, said method including the steps of:

(a) receiving in at least one of said stations a frame including at least a first address set identifying stations to receive the frame and a second address set indicating stations to be awaken;

(b) parsing the frame; and (c) restoring to full-power only stations that are members of the second address set.

13. The method of claim 12 wherein the first address set includes a Destination Address (DA).

14. The method of claim 12 wherein the second address set includes a Group Address (GA).

15. The method of claim 13 wherein the second address set includes a Universal Wake-Up address.

16. An adapter for use in coupling a computer system to a computer network comprising:

a first interface for attaching to the computer network;

a second interface for coupling to a system bus; and a Receiver section including an address decoder correlating a first set of indicia in received frames with identifying characteristics assigned to said adapter and copying the received frames if the first set of indicia matches the identifying characteristics and wake-up packet detector for generating control signals to be used to return said computer to full-power status if said frames carry a second set of indicia, different from the first set and the second set, matching identifying indicia contained in said adapter.

17. The device of claim 16 further including a transmitter for transmitting data.

* * * * *